United States Patent [19]

Messori

[11] Patent Number: 4,784,510
[45] Date of Patent: Nov. 15, 1988

[54] STRUCTURE COMPOSED OF AT LEAST TWO STRUCTURAL ELEMENTS JOINED TOGETHER BY CONNECTION MEANS

[75] Inventor: Pier P. Messori, Pino Torinese, Italy

[73] Assignee: Iveco Fiat S.p.A., Turin, Italy

[21] Appl. No.: 12,946

[22] Filed: Feb. 10, 1987

[30] Foreign Application Priority Data

Feb. 11, 1986 [IT] Italy .................. 67099 A/86

[51] Int. Cl.[4] .................................................. F16D 1/00
[52] U.S. Cl. ..................................... 403/25; 403/388;
403/408.1
[58] Field of Search .............. 403/408.1, 388, 25;
411/166, 104

[56] References Cited

U.S. PATENT DOCUMENTS 1,945,332  1/1934  Robinson ............... 403/408.1 X
4,410,298 10/1983  Kowalski ................. 411/104 X

FOREIGN PATENT DOCUMENTS 1212554 11/1970 United Kingdom ............... 403/388

*Primary Examiner*—Andrew V. Kundrat
*Attorney, Agent, or Firm*—Kane, Dalsimer, Sullivan, Kurucz, Levy Eisele & Richard

[57] ABSTRACT

The structure comprises at least a first and a second element connected together in correspondence with respective flat walls by a connection unit consisting essentially of a screw and a pair of plates each of which comprises a bore in a central position and at least two parallel projections defining opposing bearing surfaces. One plate is mounted between the head of the screw and the flat wall of the first structural element, and the other plate rests on the flat wall of the second structural element and cooperates with the end of the shank of the screw in such a manner as to lock said walls tightly together. The plates are positioned such that the respective opposing projections define two parallel planes.

16 Claims, 1 Drawing Sheet

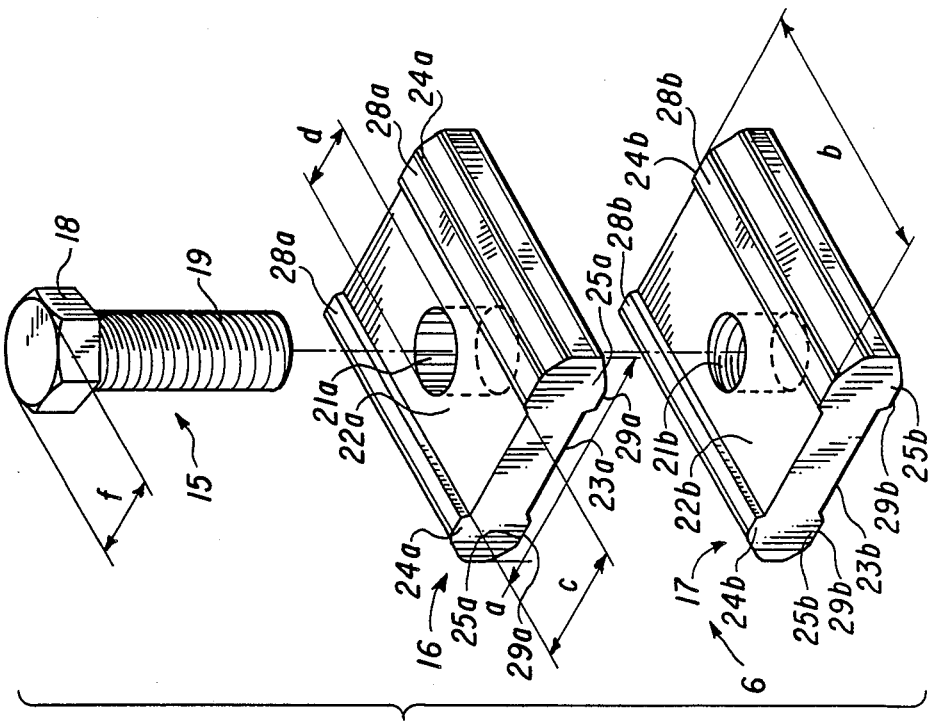
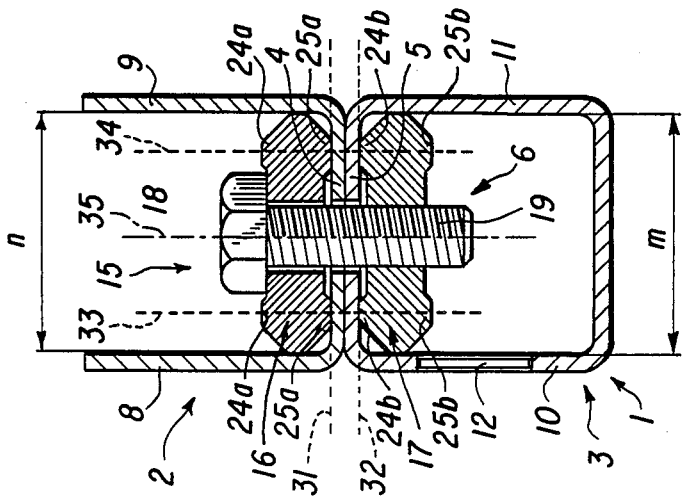

STRUCTURE COMPOSED OF AT LEAST TWO STRUCTURAL ELEMENTS JOINED TOGETHER BY CONNECTION MEANS

BACKGROUND OF THE INVENTION

This invention relates to a structure composed of at least two structural elements joined together by connection means. Particularly, but not exclusively, the said structure could be the framework of a motor vehicle, such as a motor bus, and the structural elements could conveniently be section bars. In general, a so-called "force" connection, i.e. able to withstand considerable mechanical stresses, is currently made by welding. Although this connection method is widely used, it has certain drawbacks. In this respect, from the environmental viewpoint noise, smoke and sparks are produced requiring special precautions to be taken to protect the operator. If the elements to be welded together have already undergone initial painting (for example rust protection), the paint has obviously to be removed from the zone to be welded, and this can subsequently easily trigger rust formation. Welding also requires certain subsequent work to be carried out, such as grinding, hammering and filling of the welded zones. It is also not possible to weld incompatible materials together such as a light alloy to stainless steel or aluminium etc. From the operational viewpoint, making a plurality of welds within a large-dimension structure, such as that of a motor bus, obviously leads to problems in handling the welding heads. In the specific case of motor bus structures assembled by welding, it has been noted that further drawbacks arise each as poor production flexibility if modifications have to be made to portions of the structure which have already been prewelded, the need to keep numerous different configurations of prewelded parts of the structure in stock in order to rapidly satisfy the constructional requirements of a motor bus, and difficulty in the construction and handling of structure portions which, because of progressive welding, increase in dimensions and space requirements as assembly proceeds.

SUMMARY OF THE INVENTION

The object of the present invention is to provide a structure in which adjacent structural elements are connected together in such a manner as to obviate the aforesaid drawbacks of a welded connection.

Said object is attained according to the present invention by a structure comprising at least a first and a second structural element connected together in correspondence with respective flat walls by connection means, characterised in that said connection means comprise:

a first and a second plate each of which has at least two equidistant longitudinal projections provided with flat surfaces defining respective bearing faces; said plates resting on respective opposing surfaces of said flat walls in such a manner that the pairs of opposing projections define two parallel planes; and traction means which lock said plates and said walls tightly together by exerting on these latter, by way of said projections, a locking pressure along an axis which is perpendicular to said bearing faces and lies between said projections.

BRIEF DESCRIPTION OF THE DRAWINGS

The present invention will be more apparent from the description of a preferred embodiment thereof given hereinafter by way of non-limiting example with reference to the accompanying drawing, in which:

FIG. 1 is a section through a structure constructed in accordance with the present invention; and FIG. 2 is an exploded view of a detail of FIG. 1 to an enlarged scale.

DETAILED DESCRIPTION OF THE INVENTION

In FIG. 1, the reference numeral 1 indicates overall a structure comprising a first and a second structural element, which are indicated by 2 and 3 respectively and are connected together in correspondence with respective flat walls 4, 5 by a connection unit indicated overall by 6. More particularly, the structural element 2 consists of a U-shaped section in which the distance between opposite side walls 8, 9 is indicated by n. The structural element 3 conveniently consists of a tubular section of square cross-section in which the distance between those opposite walls 10, 11 which are adjacent to the wall 5 is indicated by the letter m which, in this specific case, is identical to the said distance n. It will also be noted that the side wall 10 comprises an aperture 12, the purpose of which is stated hereinafter.

With particular reference to FIGS. 1 and 2, it will be noted that the connection unit 6 consists of a screw 15 and a pair of bored plates 16, 17 respectively. As these latter are essentially identical, only one of them will be described hereinafter, but adding the letter a to all reference numerals relating to the plate 16, and the letter b to all reference numerals relating to the plate 17.

The screw 15 has a hexagonal head 18 and a threaded shank 19. The plate 16 has an essentially parallelepiped structure rectangular in plan, and comprises in a central position a through bore 21a the diameter of which is greater than the diameter of the shank 19. The corresponding through bore 21b of the plate 17 is threaded, to be engaged by the thread of the shank 19 of the said screw 15.

The plate 16 also comprises on opposing faces, namely the upper face 22a and lower face 23a, two pairs of parallel longitudinal projections 24a, 25a respectively, each of which extends essentially along the edge of the major side of the plate 16 and comprises respective flat surfaces 28a, 29a defining respective bearing faces.

Again with reference to FIG. 2, the letters a and b indicate respectively the width and length of each plate 16, 17. The distance between the said longitudinal projections is indicated by c, and the diameter of the through bores is indicated by d. In addition, the distance between flats, or diameter, of the head 18 of the screw 15 is indicated by f.

In this specific case it will be noted that for correct dimensioning of each plate 16, 17, the width a must not exceed 3–4 times the diameter d of the respective through bore. In addition, the distance c between said projections must be only slightly greater than the distance f between the flats, or diameter, of the head 18 of the screw 15. As may be seen from FIGS. 1 or 2, the ratio of c to f must be at least as great as the ratio of the side of an equilateral triangle to the height of an equilateral triangle. Elementary geometry calculations result in a ratio of at least 1.154. The inverse of this ratio is 0.866.

In FIG. 1, the reference numerals 31 and 32 indicate the projections of the bearing faces defined respectively by the surfaces 29a and 28b of the projections 25a and 24b of the plates 16 and 17. The reference numerals 33 and 34 indicate the projections of the planes essentially defined by the opposing projections 25a, 24b of the plates 16 and 17, and the reference numeral 35 indicates the axis of the screw 15.

The structure 1 is assembled in the following manner. Firstly, a through bore is formed in a central position in the walls 4 and 5 of the structural elements 2 and 3 to allow passage of the shank 19 of the screw 15. The plate 17 is then inserted into the interior of the tubular section 3 through the aperture 12, and positioned as shown in FIG. 1. The plate 16 is likewise rested on the wall 4 of the U-shaped section 2, and the screw 15 is then tightened with a predetermined torque. By this means, the shank 19 of the screw 15 is put under tension so that the stresses deriving from this are transmitted, respectively by the lower portion of the head 18 and by the thread of the shank 19, to the walls 4 and 5 of the ssections 2 and 3 essentially in correspondence with the corners of these sections so that the stresses become displaced towards the respective adjacent vertical walls (8, 9 of the section 2 and 10, 11 of the section 3) such as to involve the entire structure 1. In other words, the pressure transmitted by the head 18 and by the threaded portion of the shank 19 in contact with the plates 16 and 17 is transferred on to those plane surfaces of the projections of the plates 16, 17 which are in contact with the walls 4, 5, thus resulting in an excellent connection between the structural elements 2 and 3 without having to use welding.

The advantages deriving from the present invention are apparent from an examination of the characteristics of the structure formed in accordance therewith. Firstly, all the drawbacks deriving directly from a welded assembly are obviated. In this respect, environmental difficulties or difficulties connected with rust generation due to paint removal from and subsequent painting of the welded zone no longer exist, and all the said necessary work subsequent to welding is obviously eliminated. It is also obviously possible to now connect even non-weldable elements together in a reliable manner, and the operational problems deriving from the welding of large-dimension structures are also much reduced as it is now necessary only to provide the plates 16, 17 and the relative screw 15 in the connection zone. With regard to the specific problems relating to large-dimension structures such as motor bus structures, it will be apparent that the construction and handling of structural parts is now simplified, and it is no longer necessary to keep entire preassembled structures of different dimensions in stock, as it is simpler and quicker to assemble a new structure than is possible by welding. Moreover, a greater production flexibility is obtained with regard to modifications to be made to large, already preassembled structural parts.

Finally, it is apparent that modifications can be made to the described structure 1 but without leaving the scope of the present invention.

For example, the shape of each plate 16, 17 could be conveniently modified so as to eliminate the longitudinal projections present on a face. In this respect, the main purpose of the symmetrical shape of these plates is to prevent errors during the assembly of the structure 1, by allowing one or other face to be mounted against the wall of the respective structural element without distinction. Two plates identical to the plate 16 (with a non-threaded through bore) could also be used, in which case the connection will be made by using a nut and bolt.

The tension which in this case is exerted by the screw 15 could be exerted in an equivailent manner by a rivet conveniently hot-clinched on to the opposing faces of the plates 16 and 17. If one of the walls 4, 5 of the structural elements 2, 3 is particularly thick, the connection could be made without using the relative plate resting on it and still obtain an outward displacement of the locking force by virtue of the other plate. Even though the structural elements connected together are two in number, it is apparent that a third element could be interposed between the said flat walls 4 and 5. In particular, if different metals are connected together it could be convenient to interpose a sheet of electrically insulating material so as to avoid the so-called Volta effect.

I claim:

1. A structure (1) comprising at least a first and a second structural element (2, 3) connected together in correspondence with respective flat walls (4, 5) by connection means (6), characterised in that said connection means (6) comprise:
   a first and a second plate (16, 17) each of which has at least two equidistant longitudinal projections (24a, 25a; 24b, 25b) provided with flat surfaces (28a, 29a; 28b, 29b) defining respective bearing faces (31, 32); said plates (16, 17) resting on respective opposing surfaces of said flat walls (4, 5) in such a manner that the pairs of opposing projections (25a, 24b) define two parallel planes (33, 34); and
   traction means (15) which lock said plates (16, 17) and said walls (4, 5) tightly together by exerting on these latter, by way of said projections (25a, 24b), a locking pressure along an axis (35) which is perpendicular to said bearing faces (31, 32) and lies between said projections (25a, 24b).

2. A structure as claimed in claim 1, characterised in that each said plate (16, 17) is essentially in the shape of a parallelepiped rectangular in plan, and said projections (24a, 25a; 24b, 25b) are disposed along opposing longitudinal edges.

3. A structure as claimed in claim 1, characterised in that each said plate (16, 17) comprises in a central position a respective through bore (21a, 21b) engaged by said traction means (15).

4. A structure as claimed in claim 3, characterised in that said traction means (15) consist essentially of a screw (15), the head (18) of which rests on a face (22a) of said first plate (16), and the threaded shank (19) of which engages a corresponding thread provided on said bore (21b) of said second plate (17).

5. A structure as claimed in claim 3, characterised in that the width (a) of each said plate (16, 17) is preferably less than or equal to 3–4 times the diameter (d) of said through bore (21a, 21b).

6. A structure as claimed in claim 5, characterised in that each said plate (16, 17) has a length (b) greater than the respective said width (a).

7. A structure as claimed in claim 4, characterised in that said head (18) of said screw (15) has a radial width (f) less than or equal to 0.866 times the distance (c) between two projections disposed on the same face of each said plate (16, 17).

8. A structure as claimed in claim 1, characterised in that each said plate (16, 17) comprises two pairs of longitudinal porjections (24a, 25a; 24b, 25b) each disposed on a respective upper face (22a, 22b) and lower face (23a, 23b).

9. A structure as claimed in claim 1, characterised in that at least one of said structural elements (2, 3) comprises, in a zone adjacent to said flat wall (4, 5) subjected to pressure by said longitudinal projections of said plates (16, 17), at least one wall (8, 9; 10, 11) conveniently bent along a line parallel to said projections.

10. A structure as claimed in claim 9, characterised in that said first structural element (2) conveniently consists of a U-shaped section having its base wall coinciding with said flat wall, and two side walls (8, 9) bent along planes parallel to said planes (33, 34) defined by said pairs of opposing projections (25a, 24b).

11. A structure as claimed in claim 10, characterised in that said side walls (8,9) of said first structural element (2) are disposed a distance (n) apart which is slightly greater than the width (a) of each said plate (16, 17).

12. A structure as claimed in claim 9, characterised in that an element (3) of said structural elements (2, 3) consists essentially of a tubular section of polygonal cross-section.

13. A structure as claimed in claim 12, characterised in that said tubular structural element (3) of polygonal cross-section comprises an aperture (12) provided in correspondence with the wall (10) adjacent to said flat wall (5) and having dimensions greater than those of each said plate (16, 17).

14. A structure as clamed in claim 12, characterised in that said tubular structural element has an essentially square cross-section in which the distance (m) between opposing walls (10, 11) adjacent to said flat wall (5) is slightly greater than the width (a) of each said plate (16, 17).

15. A structure as claimed in claim 1, characterised by being part of a motor vehicle body.

16. A structure as claimed in claim 15, characterised in that said motor vehicle is a motor bus.

* * * * *